Dec. 2, 1930. J. L. McMILLAN Re. 17,895

LOOSE LEAF BINDER

Original Filed May 31, 1929 3 Sheets-Sheet 1

WITNESS
J. T. Mains

INVENTOR
John L. McMillan
BY
Denison & Thompson
ATTORNEYS

Dec. 2, 1930. J. L. McMILLAN Re. 17,895

LOOSE LEAF BINDER

Original Filed May 31, 1929 3 Sheets-Sheet 2

WITNESS
J. J. Mains

INVENTOR
John L. McMillan
BY
Denison & Thompson
ATTORNEYS

Dec. 2, 1930. J. L. McMILLAN Re. 17,895

LOOSE LEAF BINDER

Original Filed May 31, 1929 3 Sheets-Sheet 3

WITNESS
J. T. Mains

INVENTOR
John L. McMillan
BY
Denison & Thompson
ATTORNEYS

Reissued Dec. 2, 1930

Re. 17,895

UNITED STATES PATENT OFFICE

JOHN L. McMILLAN, OF SYRACUSE, NEW YORK, ASSIGNOR TO McMILLAN BOOK COMPANY, OF SYRACUSE, NEW YORK, A CORPORATION OF NEW YORK

LOOSE-LEAF BINDER

Original No. 1,747,257, dated February 18, 1930, Serial No. 367,572, filed May 31, 1929. Application for reissue filed July 30, 1930. Serial No. 471,861.

This invention relates to a new and improved loose leaf binder.

When loose leaf binders are used as visible indices it is usual to have the leaves in the binder arranged in overlapping relation, so that a portion of each sheet appears to view so that there may be displayed thereon when desired indicia. When the leaves in a loose leaf binder are arranged in this way and for this particular use, it is frequently necessary to remove from the binder a leaf or leaves and when this has been done it is usually necessary to move either upwardly or downwardly in the binder the leaves which were adjacent to those removed, so that replacement leaves may be placed in the binder either at the top or bottom ends.

The main object of my invention is to provide a means whereby the relative position of a leaf or leaves in the binder may be changed without the necessity of removing such leaves from the rings or prongs upon which they are carried.

Another object is to provide a means which will permit such movement of leaves either upwardly or downwardly in the binder as may be desired.

Other objects and advantages relate to the size, shape, and arrangement of parts, all as will more fully appear from the following description taken in connection with the accompanying drawings, in which:—

Figures 5, 6, 7, 8:
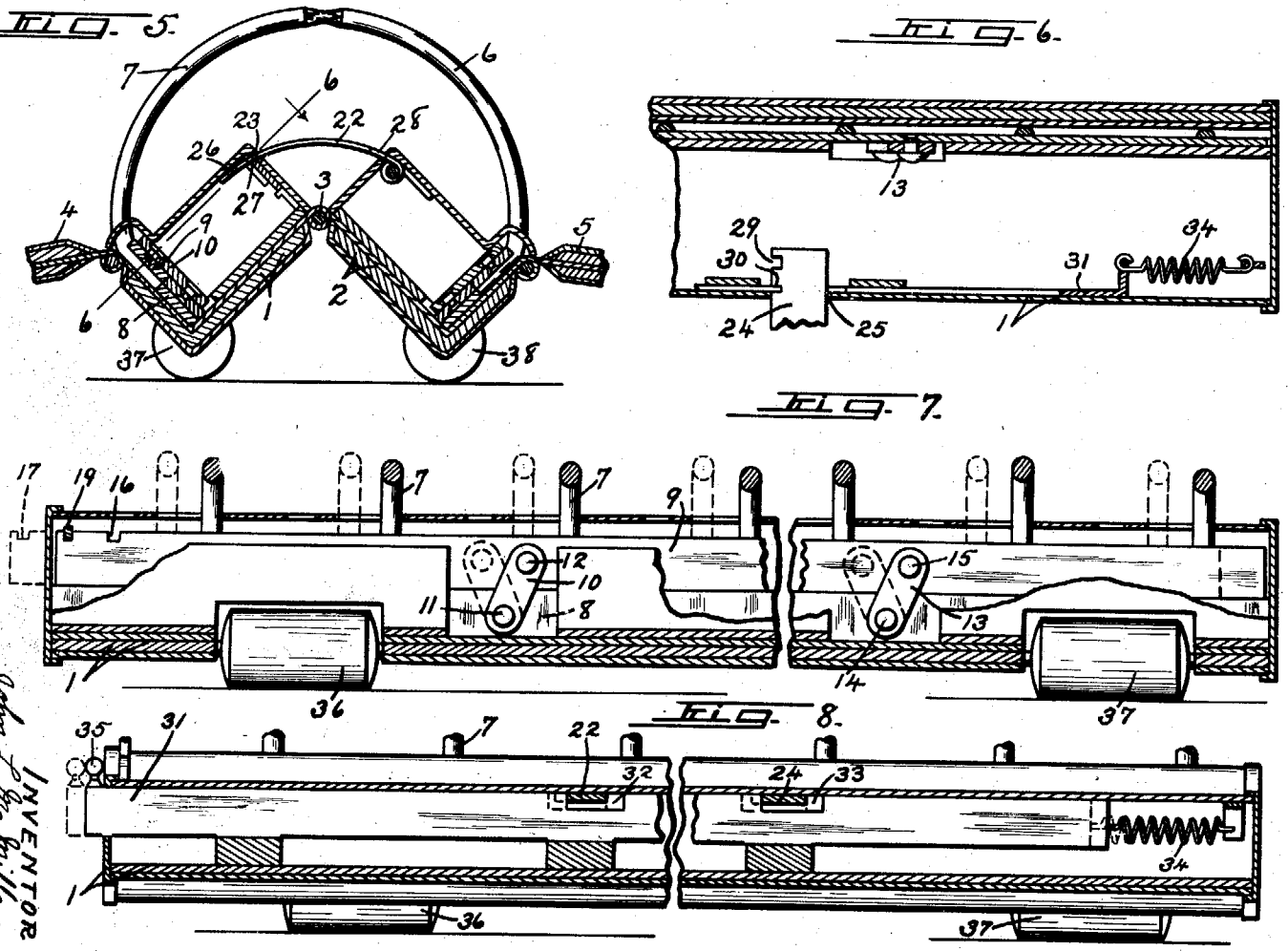
Figure 5 is a section on line 5—5 of Figure 2.
Figure 6 is a section on line 6—6 of Figure 5.
Figure 7 is a section, partially broken away, on line 7—7 of Figure 3.
Figure 8 is a section, partially broken away, on line 8—8 of Figure 3.

As perhaps may best be seen from Figure 5, my device consists of opposed housings 1 and 2, having their inner longitudinal edges hingedly connected by a pintle 3. A cover 4 is hingedly connected to the outside upper edge of housing 1, and a cover 5 is hingedly connected to the upper outer edge of housing 2.

A plurality of prongs 7, in this case shown as nine, is mounted in housing 1, and a plurality of opposed prongs 6, in this case shown as nine, is mounted in housing 2 in staggered relation to the prongs carried on housing 1.

The means provided for supporting the prongs 6 mounted on housing 2 is similar to the means provided for supporting the prongs 7 mounted on housing 1, so that a description of the means by which prongs 7 are supported will also be a description of a similar means which is provided for supporting prongs 6.

I provide in housing 1 a longitudinally extending bar 8 rigidly secured to the outer side of housing 1, as by welding or other convenient means. As perhaps may best be seen from Figure 7, a second bar 9 is positioned on the upper edge of bar 8. Bar 9 has secured thereto, by welding or by other convenient means, prongs 7.

A link or crank-arm 10 has its lower end pivotally mounted on bar 8 by means of a pivot pin 11, and has its upper end pivotally secured to bar 9 by means of a pivot pin 12. A similar link or crank-arm 13 has its lower end pivotally mounted on bar 8 by means of a pivot pin 14 and has its upper end pivotally mounted on bar 9 by means of a pivot pin 15. The length of links 10 and 13 is such that when such links are in a vertical position, bar 9 will be in spaced relation to bar 8 from which position it may be moved laterally in either direction, which movement will cause bar 9 to move laterally and downwardly into contact with the upper edge of bar 8. When bar 9 is in contact with bar 8, links 10 and 13 will be in an oblique position with reference to a line normal to the axis of pivot pin 11. In Fig. 7, I have shown in heavy lines the position of links 10 and 13 with bar 9 in contact with bar 8, and I have shown in dotted line the position of links 10 and 13, when bar 9 has been moved laterally to the other position in contact with bar 8.

In Figure 7, I have shown prongs 7 in one position in heavy lines and in the shifted position in dotted lines from which it will be seen that when bar 9 is moved in relation to bar 8 the prongs 7 will be moved laterally of housing 1.

Figure 3:
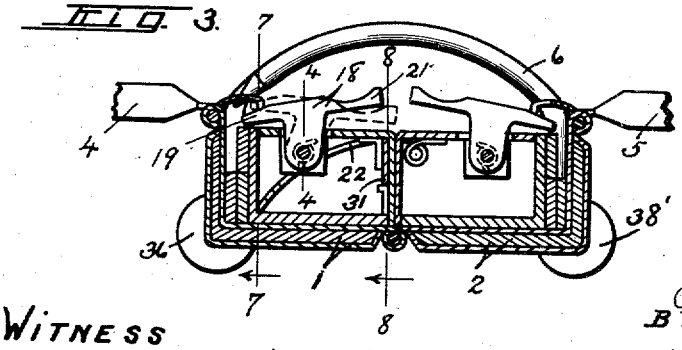
Figure 3 is a section on line 3—3 of Figure 1.
Figure 4:
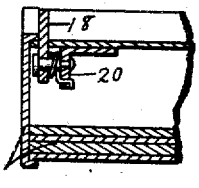
Figure 4 is a section on line 4—4 of Figure 3.

In order to releasably secure bar 9 in one of the two operative positions which it may assume with reference to bar 8, I provide in the upper edge of bar 9 adjacent one end of housing 1, a pair of spaced notches 16 and 17. On the upper surface of housing 1, as perhaps may best be seen from Figure 3, is pivotally mounted a detent 18 having an end 19 adapted to engage a notch 16 or 17 when it is in registration therewith, and such engagement of end 19 with notch 16 or 17 will prevent any movement of bar 9 in relation to housing 1. Detent 18 is normally spring-pressed by a spring 20 towards bar 9. A finger rest 21 is provided on the inner end of detent 18 to facilitate the movement of the same about its pivot against the pressure of spring 20 to release the end 19 from the notch 16 or 17 with which it was engaged.

Figure 1:
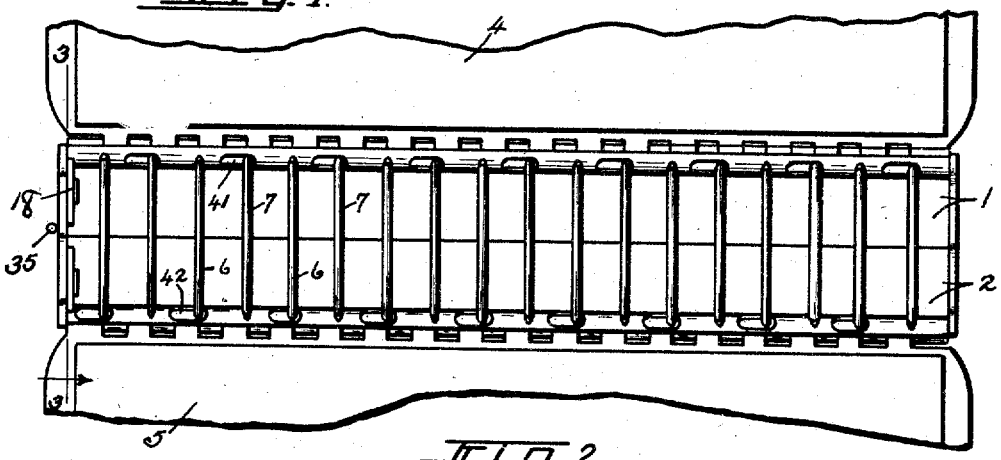
Figure 1 is a top plan view, partially broken away, of my binder with the prongs in the closed position.
Figure 2:
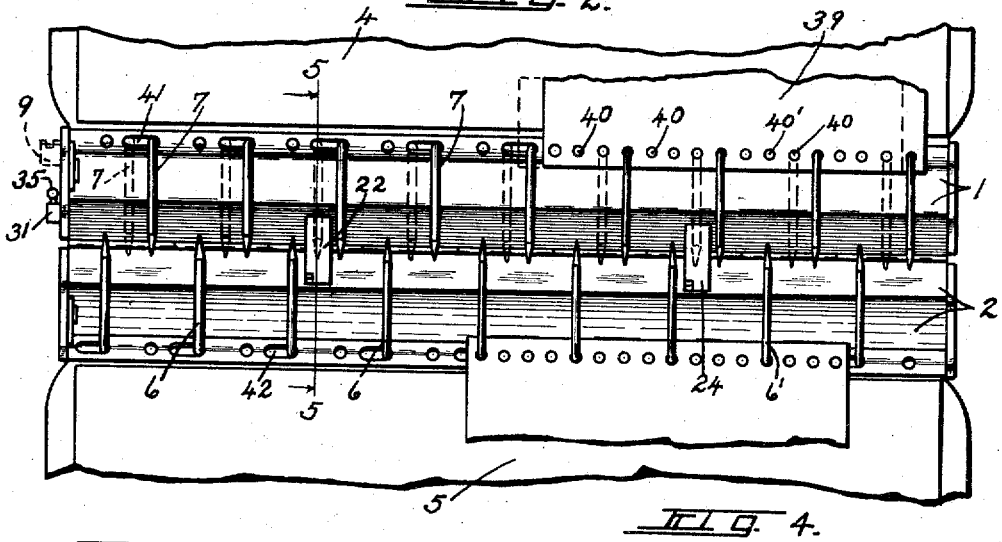
Figure 2 is a top plan view similar to Figure 1 with the prongs in the transferring position.

My binder is designed to be used in three different positions of housings 1 and 2 in relation to each other. In Figure 1, I have shown the binder in the closed position ready to be used as a book. In Figure 2, I have shown the binder in the intermediate or transferring position with the ends of the prongs 6 and 7 in overlapping relation. The third position, which I have not here illustrated, is one in which housings 1 and 2 have been separated a sufficient distance so that the prongs 6 and 7 do not overlap, this position being provided to facilitate the removal of leaves from the binder and the placing of new leaves therein.

For the purpose of securing the binder in a selected one of the positions just described, I provide a latch 22, having one end secured in housing 2 and having its other end extending through an aperture 23 in housing 1. A similar latch 24 also has one end secured in housing 2 and has its other end extending through another aperture 25 in housing 1, latches 22 and 24 being in spaced relation. Latch 22 is provided on one longitudinal edge with notches 26, 27 and 28 Fig. 5. Latch 24 is provided with similar notches in alinement with the notches in latch 22, two only of such notches 29 and 30 in latch 24 being here shown.

As perhaps may best be shown from Figure 8, I provide a keeper bar 31 slidably mounted in housing 1 and being provided in its upper edge with spaced slots 32 and 33 through which latches 22 and 24 respectively extend. The thickness of keeper bar 31 is slightly less than the width of the notches in latches 22 and 24, so that when the keeper bar 31 is moved inwardly it will engage a notch in latch 22 and the corresponding notch in latch 24 with which it is in registration and will hold the latches 22 and 24 against movement through the slots 23 and 25 in housing 1 to retain housings 1 and 2 in fixed relation.

Keeper bar 31 is normally held inwardly and in registration with latches 22 and 24 by means of a spring 34 which has one end secured to the inner end of keeper bar 31 with its other end secured to housing 1. For the purpose of providing a convenient means for manually retracting keeper bar 31 from the notches in latches 22 and 24 against the action of spring 34, I provide on the outer end of keeper bar 31 beyond the end of housing 1, a knob 35.

The slots 32 and 33 are sufficiently long as compared with the width of latches 22 and 24, so that the keeper bar 31 may be moved outwardly from registration with the notch in latches 22 and 24 to permit the movement through slots 32 and 33 of latches 22 and 24 respectively when it is desired to have the relative position of the housings 1 and 2 changed.

The notches in latches 22 and 24 are so positioned that when the keeper bar 31 is in registration with notch 26 in latch 22 and notch 29 in latch 24, the binder will be in the open position, while when the keeper bar 31 is in registration with notch 33 in latch 22 and with notch 30 in latch 24, the binder will be in the transferring position with the ends of prongs 6 and 7 in overlapping relation. The notch 28 in latch 22 and the corresponding notch, not shown, in latch 24 are so positioned that when the keeper bar 31 is in registration with such notches, the book will be locked in closed position, as shown in Figure 1.

For the purpose of facilitating the manipulation of the binder and its movement on a table or desk, I prefer to provide on the outer longitudinal under edge of housing 1, a pair of spaced rollers 36 and 37, and a similar pair of spaced rollers 38, 38′ in the outer longitudinal under edge of housing 2.

*Operation*

When it is desired to employ my device for the purpose of changing the relative position of a leaf in the binder, I retract the keeper bar 31 to release latches 24 and 22 and then move housings 1 and 2 about their hinge 3 until slot 27 in latch 22 and slot 30 in latch 24 come into registration with keeper bar 31. Keeper bar 31 is then allowed to move inwardly by the action of spring 24 to engage such slots and lock housings 1 and 2 against further movement. With the parts in this relation, the ends of prongs 6 and 7 will be in overlapping relation shown in Figures 2 and 5.

On Figure 2, I have indicated a partially broken-away leaf 39 in position on prongs 7. Such leaf 39 is provided with a plurality, in this case shown as sixteen, of holes 40 so spaced that there will be three holes 40 between each of the adjacent prongs 7 upon which the leaf 39 is positioned. When the parts are in the relation shown in heavy lines on Figure 2, it will be seen that if the leaf 39 is moved from the prongs 7 on to the prongs 6, the prong 6′ will enter the hole 40′. Similarly, if when the parts are in the relation so indicated, the housings 1 and 2 are moved about their hinge 3 to bring the binder into the closed position as shown in Figure 1, the prongs 6′ would also enter the hole 40′ in leaf 39. That is to say, with the parts in the relation shown in heavy lines in Figure 2, the movement of a sheet 39 from the prongs 7 to the prongs 6 would not change the relative position of leaf 39 when the binder was thereafter closed.

When it is desired to change the relative position of a leaf 39, the binder is placed in the transferring position as shown in Figure 2 with the leaf on the prongs 7 and the detent 18 is then moved about its pivot to remove the end 19 from the slot 17 in plate 9. Plate 9, prongs 7 being used as finger holds, is then moved upwardly, laterally and downwardly in relation to plate 8 which will bring the prongs 7 into the position shown in dotted lines on Figures 2 and 7. The end 19 of detent 18 is then permitted to engage the slot 16 in plate 9 to lock the parts in their new position. This lateral movement of prongs 7 is permitted due to the fact that they extend outwardly through slots 41 in the upper face of housing 1. Similar slots 42 are provided in the upper face of housing 2 through which slots 42, prongs 6 extend.

When the prongs 7 have been moved laterally into the position shown in dotted lines of Figure 2, the leaf 39 will have also been moved laterally of the binder. This lateral movement of sheet 30 will cause hole 40′ to be moved laterally and out of registration with prongs 6′ so that when sheet 39 is moved from prongs 7 on to prongs 6, the prong 6′ will not enter the hole 40′ but will enter the hole 40 next adjacent thereto so that it will have been moved laterally of the binder with respect to prongs 6. When the sheet 39 has been moved on to prongs 6, the detent 18 is again moved about its pivot to release plate 9, and plate 9 is then moved upwardly, laterally and downwardly with respect to plate 8 into the original position. Detent 18 is then permitted to engage slot 17 in plate 19.

Keeper plate 31 is then moved outwardly out of registration with latches 22 and 24 and housings 1 and 2 are moved about their hinge to bring the binder to the closed position after which the keeper plate 31 is allowed to move inwardly to engage latches 22 and 24 to lock housings 1 and 2 in position. It will be understood that although I have referred to a single sheeet 39 as being transferred from prongs 7 to prongs 6, yet it is possible to transfer any desired number of sheets at one time in this operation.

The construction of parts is such that in the operation just described the prongs 7 may be moved in only one direction for the purpose of transferring sheets laterally of the binder. If it is desired to transfer sheets in the opposite direction, the sheets to be transferred are initially placed upon prongs 7. The binder is then opened to the transferring position in the manner just described and prongs 6 are then moved laterally of the binder in the same way and through the manipulation of the same type of parts as was employed when the prongs 7 were moved. The sheets are then transferred to prongs 6 after which prongs 6 are moved laterally to their original position and the book closed.

The permitted lateral movement of prongs 6 being in the same direction as the permitted lateral movement of prongs 7, the transfer of leaves from prongs 7 to prongs 6 after the latter have been moved to the transferring position, and the subsequent return of prongs 6 to the original position will cause the leaves to be moved laterally in the binder in a direction opposite to the direction they would have been moved if they had been transferred from prongs 7 to prongs 6 when the prongs 7 had been placed in the transferring position.

I have here shown a binder in which both sets of prongs are movable in the binder in the same direction and I have just explained in the two preceding paragraphs how the binder is used when it is desired to move a sheet towards one end or towards the other end of a binder. The use of two sets of movable prongs is by some considered more convenient in that the sheet to be transferred may always be started from the same side of the binder. It is possible, however, and sometimes desirable because of the economy in manufacture, with a resulting lower cost to the consumer to provide only one set of movable prongs, the other set being fixed.

When a binder of this latter type is used, the movement of a sheet in one direction in the binder is accomplished in exactly the same way as with a binder having both sets of prongs movable. That is to say, considering Figure 2, if it is desired to transfer a sheet 39 towards the left, the binder is opened to the transferring position in the usual manner with the sheet 39 to be transferred on the prongs 7. The prongs 7 are then moved laterally to the position shown in dotted lines and the sheet 39 is then transferred to the prongs 6. The prongs 7 are then returned to their original position and the binder is closed.

If it is desired to move a sheet 39 to the right, the same operations are performed except that in such case the sheet 39 is initially placed on prongs 6 and is from them transferred to prongs 7 after prongs 7 have been moved to the position shown in dotted lines. When the prongs 7 are then returned to their original position they will carry with them sheet 39 with the result that sheet 39 will have been moved to the right in the binder.

After this has been done, the binder is closed in the usual way.

Figure 9:
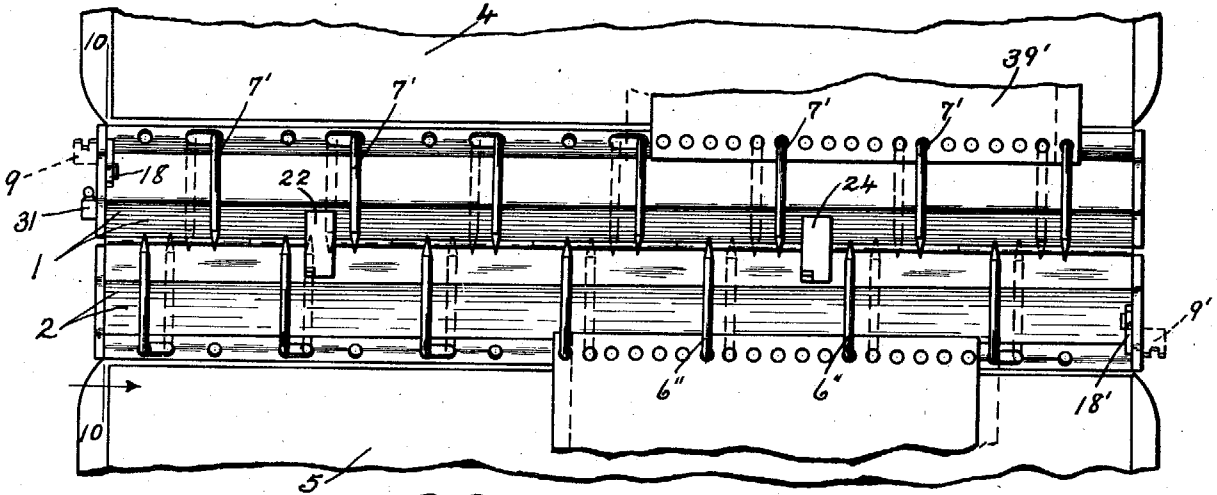
Figure 9 is a top plan view, partially broken away, of a modified form of my binder.
Figure 10:
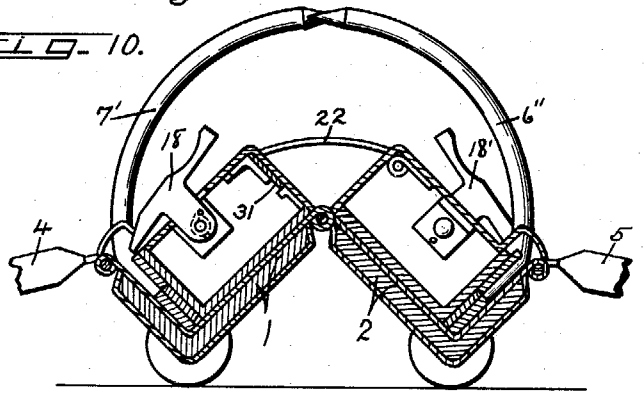
Figure 10 is a section on line 10—10 of Figure 9.

In Figures 9 and 10, I have shown a modified form of my device having similar housings 1 and 2 and covers 4 and 5. Housing 1 and the different parts of the apparatus carried in it are constructed in the same way as were constructed the housing 1 and parts therewith hitherto described.

The parts in housing 1 comprise the bar 9 carrying the prongs 7′, the latch 18 for the bar 9, the keeper bar 31, and the latches 22 and 24. The lateral movement of prongs 7′ on such housing 1 is accomplished in exactly the same manner as was the movement of the prongs 7 in the housing 1 heretofore described.

In housing 2, I provide a similar set of parts as bar 9′, latch 18′ and prongs 6″ carried on bar 9′, the only difference being that bar 9′ carrying prongs 6″ is adapted to be moved, when it is desired to place such prongs 6″ in the transferring position, in a direction opposite to the direction in which bar 9 is moved to place prongs 7′ in the transferring position.

In order to permit the simultaneous movement of prongs 7′ in one direction and prongs 6″ in the opposite direction it is necessary that prongs 7′ be spaced a greater distance apart than in either of the embodiments of my invention heretofore described, and it is also necessary that prongs 6″ similarly be spaced apart a greater distance so that such simultaneous movement of prongs 7′ and prongs 6″ may be effected without the prongs 7′ coming into contact with prongs 6″.

The advantage of this last-described construction is that it permits a lateral movement of a sheet in the binder in one operation a distance double the distance of movement which is possible with only one set of movable prongs or with two sets of movable prongs when the same can be moved only in the same direction. This will be apparent from an examination of Figure 9 where we will assume that a sheet 39′, positioned on prongs 7′ is to be moved to the left. In this case, the binder is opened to the transferring position in the usual way. The prongs 7′ are then shifted to the position shown in dotted lines. The prongs 6″ are then moved to the position shown in dotted lines. The sheet 39′ is then transferred from the prongs 7′ to the prongs 6″ after which the prongs 7′ and the prongs 6″ are returned to their original position, that shown in heavy lines. The binder is then closed in the usual way.

It will be seen that when the prongs 7′ are moved laterally they will carry with them, the sheet 39′ the distance of their movement. When the sheet 39′ is then transferred to the prongs 6″, which prongs 6″ have previously been moved to the right, the sheet 39′ will be carried an additional distance to the left when the prongs 6″ are returned to the normal position.

It will be understood that my invention may be used with different types of binders other than the particular type of prong binder here illustrated. It will also be understood that the length of movement of the prongs in the binder may be varied as desired provided only that the distance between the prongs on one housing is sufficient to permit the lateral movement of the prongs on the other housing without having the two sets of prongs come into contact with each other.

It will also be understood that the number of prongs or rings carried on a housing and their relative position in relation to the prongs or rings carried on the opposing housing may be varied as may the shape of such prongs without departing from the spirit of my invention, for although I have shown and described specific structures and forms of parts as illustrative of embodiments of my invention, I do not desire to restrict myself to the exact size, shape or arrangement of parts as various changes and modifications may be made within the scope of the appended claims.

I claim:

1. In a device of the class described, a pair of opposed back members hingedly connected together, a cover hinged to each back member, a longitudinally extending plate secured in one back member, a second plate in parallel relation to the first-named plate, spaced links connecting said plates and adapted to permit relative movement of the second-named plate with respect to the first-named plate, a plurality of spaced prongs carried by the second-named plate, and a plurality of prongs in staggered relation to the first-named prongs and carried on the other back member.

2. In a device of the class described, a pair of opposed back members hingedly connected together, a cover hinged to each back member, a longitudinally extending plate secured in one back member, a second plate in parallel relation to the first-named plate, spaced links connecting said plates and adapted to permit relative movement of the second-named plate with respect to the first-named plate, means for locking the second-named plate in a selected one of a plurality of positions with respect to the first-named plate, a plurality of spaced prongs carried by the second-named plate, and a plurality of prongs in staggered relation to the first-named prongs and carried on the other back member.

3. In a device of the class described, a pair of opposed back members hingedly connected together, a cover hingedly connected to each back member, a longitudinally extending plate, a plurality of spaced prongs secured to the plate, spaced links each having one end pivoted to the plate and the other end pivoted to one of the back members, and a plurality of prongs carried on the other back member and in staggered relation to the first-named prongs.

4. In a device of the class described, a pair of opposed back members hingedly connected together, a cover hingedly connected to each back member, a longitudinally extending plate, a plurality of spaced prongs secured to the plate, spaced links each having one end pivoted to the plate and the other end pivoted to one of the back members, a second longitudinally extending plate, and spaced links, each having one end pivoted to the second-named plate and the other end pivoted to the other back member and a plurality of prongs carried by the second-named plate, the first-named prongs being in staggered relation to the second-named prongs.

5. In a device of the class described, a pair of opposed back members hingedly connected together, a cover hingedly connected to each back member, a longitudinally extending plate, a plurality of spaced prongs secured to the plate, spaced links each having one end pivoted to the plate and the other end pivoted to one of the back members, and a plurality of prongs carried on the other back member.

6. In a device of the class described, a pair of opposed back members hingedly connected together, a cover hinged to each back member, a longitudinally extending plate secured in one back member, a second plate in parallel relation to the first-named plate, spaced links connecting said plates and adapted to permit relative movement of the second-named plate with respect to the first-named plate, a plurality of spaced prongs carried by the second-named plate, and a plurality of prongs on the other back member.

7. A loose leaf book comprising a back, a plate, a series of prongs mounted on the plate, spaced crank arms each having one end pivotally connected to the plate and the other end pivotally connected to the back to permit simultaneous rocking of said crank arms for moving the plate with reference to the back, and a second series of prongs mounted at the opposite side of the back.

8. A loose leaf book comprising a back, a plate, a series of prongs mounted on the plate, spaced crank arms each having one end pivotally connected to the plate and the other end pivotally connected to the back to permit simultaneous rocking of said crank arms for moving the plate with reference to the back, a second series of prongs mounted at the opposite side of the back, and spring-actuated means for holding the plate in a normal position.

9. A loose leaf book comprising a back, a pair of plates on said back, a series of prongs carried by each plate, and a crank arm having one end pivotally connected to one of said plates and its opposite end pivotally mounted on the back to permit movement of said plate with reference to the back about the pivotal axis of said crank arm on the back.

10. A loose leaf book comprising a back, a pair of plates positioned at opposite sides of the back, a set of prongs mounted upon each plate, and a pair of crank arms each having one end pivoted to one of the plates and its opposite end pivotally connected to the back.

11. A loose leaf book comprising a back, a pair of plates positioned at opposite sides of the back, a set of prongs mounted upon each plate, a pair of crank arms each having one end pivoted to one of the plates and its opposite end pivotally connected to the back, and separate spring-actuated means for holding each of the plates in a normal position.

In witness whereof, I have hereunto set my hand this 22 day of July, 1930.

JOHN L. McMILLAN.